United States Patent
Asrani et al.

(10) Patent No.: US 11,533,071 B2
(45) Date of Patent: Dec. 20, 2022

(54) CROSS-COMMUNICATION BETWEEN WIRELESS DEVICES WITH MULTIPLE ANTENNAS

(71) Applicant: Google LLC, Mountain View, CA (US)

(72) Inventors: Vijay Asrani, San Jose, CA (US); Jiang Zhu, Cupertino, CA (US); Nan Xu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 36 days.

(21) Appl. No.: 17/104,924

(22) Filed: Nov. 25, 2020

(65) Prior Publication Data
US 2022/0166450 A1    May 26, 2022

(51) Int. Cl.
*H04B 1/04*    (2006.01)
*H04B 1/10*    (2006.01)
(Continued)

(52) U.S. Cl.
CPC ........... *H04B 1/1027* (2013.01); *H01Q 1/521* (2013.01); *H01Q 21/28* (2013.01); *H04B 1/0475* (2013.01); *H04B 1/405* (2013.01)

(58) Field of Classification Search
CPC ........ H04B 1/44; H04B 1/405; H04B 1/0475; H01Q 21/28
(Continued)

(56) References Cited

U.S. PATENT DOCUMENTS

| 7,724,201 B2 | 5/2010 | Nysen et al. |
| 2007/0218853 A1* | 9/2007 | Yu ..................... H04B 7/0814 455/272 |

(Continued)

FOREIGN PATENT DOCUMENTS

| CN | 208273204 U | 12/2018 |
| CN | 109547885 A | 3/2019 |

(Continued)

OTHER PUBLICATIONS

International Search Report and Written Opinion for International Application No. PCT/US2020/042094 dated Mar. 19, 2021. 16 pages.

*Primary Examiner* — Emmanuel Bayard
(74) *Attorney, Agent, or Firm* — Colby Nipper PLLC

(57) ABSTRACT

Systems, methods, and apparatuses, including electronic devices and computer-readable storage media, for adaptively switching wireless connections between antennas of a wearable electronic device and a host electronic device. One device includes a wearable electronic device with a first and second housing, each housing including two or more antennas. The wearable electronic device is configured to establish and monitor a wireless cross-link between two antennas in different housings, or between antennas in one housing and antennas of a host electronic device. The wearable electronic device can monitor the integrity of the wireless cross-link, and establish an updated cross-link in response to the wireless cross-link not meeting a predetermined integrity threshold. The wearable electronic device can monitor a wireless cross-head link between housings of a wearable electronic device at the same time as a wireless cross-body link between the wearable electronic device and the host electronic device.

19 Claims, 6 Drawing Sheets

(51) Int. Cl.
  *H01Q 1/52* (2006.01)
  *H01Q 21/28* (2006.01)
  *H04B 1/405* (2015.01)
(58) Field of Classification Search
  USPC .......................... 375/219, 262, 267, 299, 340
  See application file for complete search history.

(56) References Cited

U.S. PATENT DOCUMENTS

| | | |
|---|---|---|
| 2009/0168847 A1 | 7/2009 | Tornatta et al. |
| 2012/0162032 A1 | 6/2012 | Yang et al. |
| 2012/0236955 A1* | 9/2012 | Zhou ...................... H04B 7/061 375/267 |
| 2015/0303979 A1 | 10/2015 | Shin et al. |
| 2017/0029107 A1* | 2/2017 | Emami ................. G01S 13/003 |
| 2017/0134845 A1* | 5/2017 | Milam ................. H04R 1/1058 |
| 2018/0248811 A1 | 8/2018 | Di Nallo et al. |
| 2020/0045422 A1 | 2/2020 | Chiang et al. |
| 2020/0091590 A1 | 3/2020 | Su et al. |
| 2020/0169435 A1* | 5/2020 | Kang ....................... H04L 5/10 |

FOREIGN PATENT DOCUMENTS

| | | |
|---|---|---|
| EP | 3190805 A1 | 7/2017 |
| WO | 2018063506 A1 | 4/2018 |

\* cited by examiner

CROSS-COMMUNICATION BETWEEN WIRELESS DEVICES WITH MULTIPLE ANTENNAS

BACKGROUND

Wearable electronic devices typically have an antenna that connects the wearable electronic device to a host electronic device. In some instances, the antenna may also connect one component of a wearable electronic device to another, such as when the wearable electronic device is a pair of earbuds. Due to the typical small form factor of wearable electronic devices, the antenna may compete for space with other components of the wearable electronic device that may be positioned within close proximity of one another. In addition, the small form factor can result in interference of signals transmitted by the transceiver of an antenna with other components of the wearable electronic device, such as with conductive components like circuit boards. This potential interference can affect connections between a wearable electronic device and a host electronic device.

This potential interference can also affect the wearable electronic device itself. For example, the device can be a pair of truly wireless earbuds that do not have a physical connection for communicating data between earbuds of the pair. The potential interference can result in lost or degraded data between the earbuds, which can directly impact user experience, especially when the earbuds are not able to generate output in synchronization, or do so but with a noticeable delay.

SUMMARY

This present disclosure generally relates to managing cross-communication between truly wireless devices and a host electronic device, such as a cellphone. Aspects of this disclosure include systems, methods, and apparatus (including computer-readable storage media) for establishing, monitoring, and maintaining wireless connections between a wearable electronic device and a host electronic device using techniques described below for managing the wireless connections using diversity antennas on one or both of the wearable electronic device and host electronic device.

A wearable electronic device implementing the technology described herein can establish a wireless cross-link between multiple antennas of a plurality of housings of the wearable electronic device each including a plurality of antennas, determine that the integrity of the established cross-link does not meet a predetermined integrity threshold, and update the cross-link between the plurality of antennas transmit data between different antennas. In some implementations, the wearable electronic device and/or the host electronic device can establish, monitor, and trigger an adaptive switch to establish a second wireless cross-link between an antenna of the wearable electronic device housing an antenna, and an antenna of the host electronic device.

In general, one innovative aspect of the disclosure provides for a wearable electronic device including a first housing including a first and second antenna; a second housing including a third and fourth antenna; and one or more processors. The one or more processors can be configured to establish a wireless cross-link between (i) either the first or second antenna of the first housing and (ii) either of the third antenna or fourth antenna of the second housing; receive information corresponding to the integrity of the wireless cross-link between the respective antennas of the first and second housing; and determine that the integrity of the wireless cross-link does not meet a predetermined integrity threshold. In response to the determination that the integrity of the wireless cross-link does not meet the predetermined integrity threshold, the one or more processors are configured to establish an updated wireless cross-link between respective antennas of the first and second housing that are different from the antennas connected by the wireless cross-link.

The one or more processors can be further configured to trigger an adaptive switch on the wearable electronic device to establish the updated wireless cross-link. Performing the adaptive switch can include polling each of a plurality of candidate cross-links between the first, second, third, and fourth antenna of the wearable electronic device to determine a respective measure of integrity, and selecting the candidate cross-link with the highest measure of integrity as the updated wireless cross-link.

The one or more processors can be further configured to establish the updated wireless cross-link using a crossover switch coupling the first and the second antenna to a transceiver in the first housing.

The wireless cross-link can be a first wireless cross-link. The one or more processors can be further configured to establish a second wireless cross-link between (i) either the first, second, third, and fourth antenna of the wearable electronic device and (ii) a fifth antenna of a host electronic device coupled to the wearable electronic device; receive information corresponding to the integrity of the second wireless cross-link between the respective antennas of the wearable electronic device and the host electronic device; and determine that the integrity of the second wireless cross-link does not meet the predetermined integrity threshold. In response to the determination that the integrity of the second wireless cross-link does not meet the predetermined integrity threshold, the one or more processors are configured to establish a second updated wireless cross-link between respective antennas of the wearable electronic device and the host electronic device that are different from the antennas connected by the second wireless cross-link.

The second wireless cross-link can be a cross-body link formed across the body of a user of the wearable electronic device and the host electronic device, when both the wearable electronic device and the host electronic device are worn on the body of the user.

The one or more processors can be further configured to establish the second updated wireless cross-link between respective antennas of the wearable electronic device and the host electronic device that are different from the antennas connected by the first updated wireless cross-link.

The one or more processors can be further configured to receive usage characteristics related to the use or location of the wearable electronic device or the host electronic device through one or more sensors coupled to the wearable electronic device; and trigger an adaptive switch of the updated first or second wireless cross-link to establish a new wireless cross-link in response to the received usage characteristics.

The wearable electronic device can include the one or more sensors.

The usage characteristics can include location data of the physical location of the host electronic device. The one or more processors can be further configured to trigger the adaptive switch of the updated first or second wireless cross-link in response to receiving location data indicating a change of location of the wearable electronic device or the host electronic device meeting a location-trigger threshold.

The usage characteristics can include orientation data of the physical orientation of at least part of the body of a user of the wearable electronic device. The one or more processors can be further configured to trigger the adaptive switch of the updated first or second wireless cross-link in response to received orientation data indicating a change of orientation of the body of the user meeting an orientation-trigger threshold.

The wearable electronic device can be a pair of truly wireless earbuds that includes a first earbud including the first housing and a second earbud including the second housing. The first earbud and the second earbud can include respective sensors. The updated wireless cross-link can be a cross-head link between antennas of the first and the second earbud formed across the head of a user of the wearable electronic device, when the wearable electronic device is worn in the ears of the user. The one or more processors can be further configured to: receive sensor data from at least one sensor of the respective sensors of the first earbud and the second earbud, trigger an adaptive switch of the updated wireless cross-link to establish a new wireless cross-link in response to the received sensor data.

The respective sensors can include sensors configured to measure changes in the orientation or position of one or both of the first earbud and the second earbud. The one or more processors can be further configured to: trigger the adaptive switch of the updated wireless cross-link to establish the new wireless cross-link in response to received sensor data indicating a change in the orientation or the position of one or both of the first earbud and the second earbud meeting a predetermined orientation- or position-trigger threshold.

The respective sensors can include sensors configured to measure changes in radiation emitted from or reflected by a user of the wearable electronic device. The one or more processors can be further configured to trigger the adaptive switch of the updated wireless cross-link to establish the new wireless cross-link in response to received sensor data indicating a change in the radiation emitted from or reflected by the user and meeting a predetermined radiation-trigger threshold.

The first antenna can be a planar antenna, and the second antenna can be a monopole antenna.

The one or more processors can be further configured to receive a received signal strength indicator (RSSI). The predetermined integrity threshold can be a minimum RSSI for the wireless cross-link.

The wearable electronic device can further include input hardware and a buffer configured to store incoming audio received by the input hardware. The one or more processors can be further configured to receive a ratio of data stored in the buffer to the maximum capacity of the buffer over a period of time. The predetermined integrity threshold hold can be a minimum ratio of data stored in the buffer to the maximum capacity of the buffer over a period of time.

Other implementations of the foregoing aspect can include a computer-implemented-method performed a computing device, an apparatus, and computer programs recorded on one or more computer-readable storage media.

BRIEF DESCRIPTION OF THE DRAWINGS

Like numbers indicate like elements in the figures.

DETAILED DESCRIPTION

Figure 1:
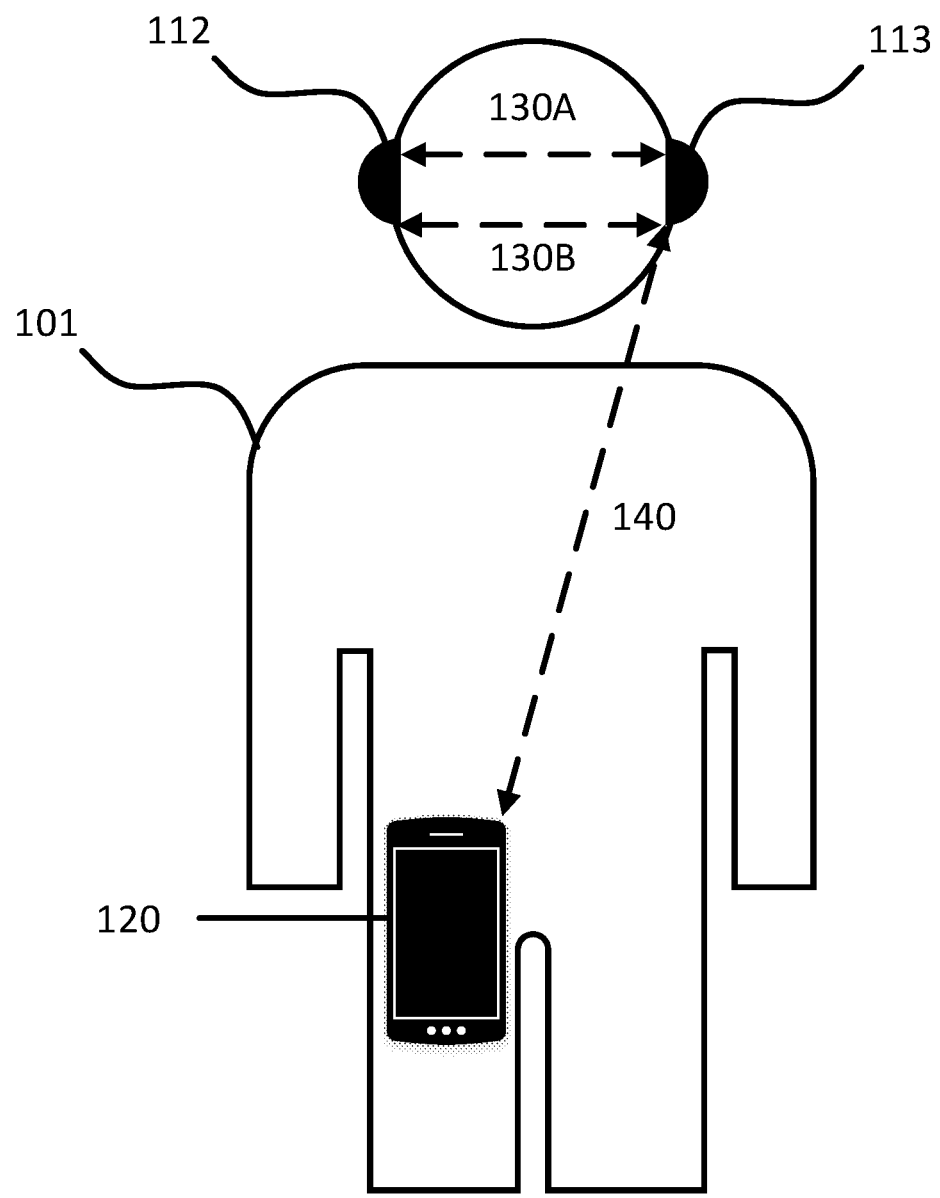
FIG. 1 is a diagram showing a wearable electronic device in communication with a host electronic device.
Figure 2:
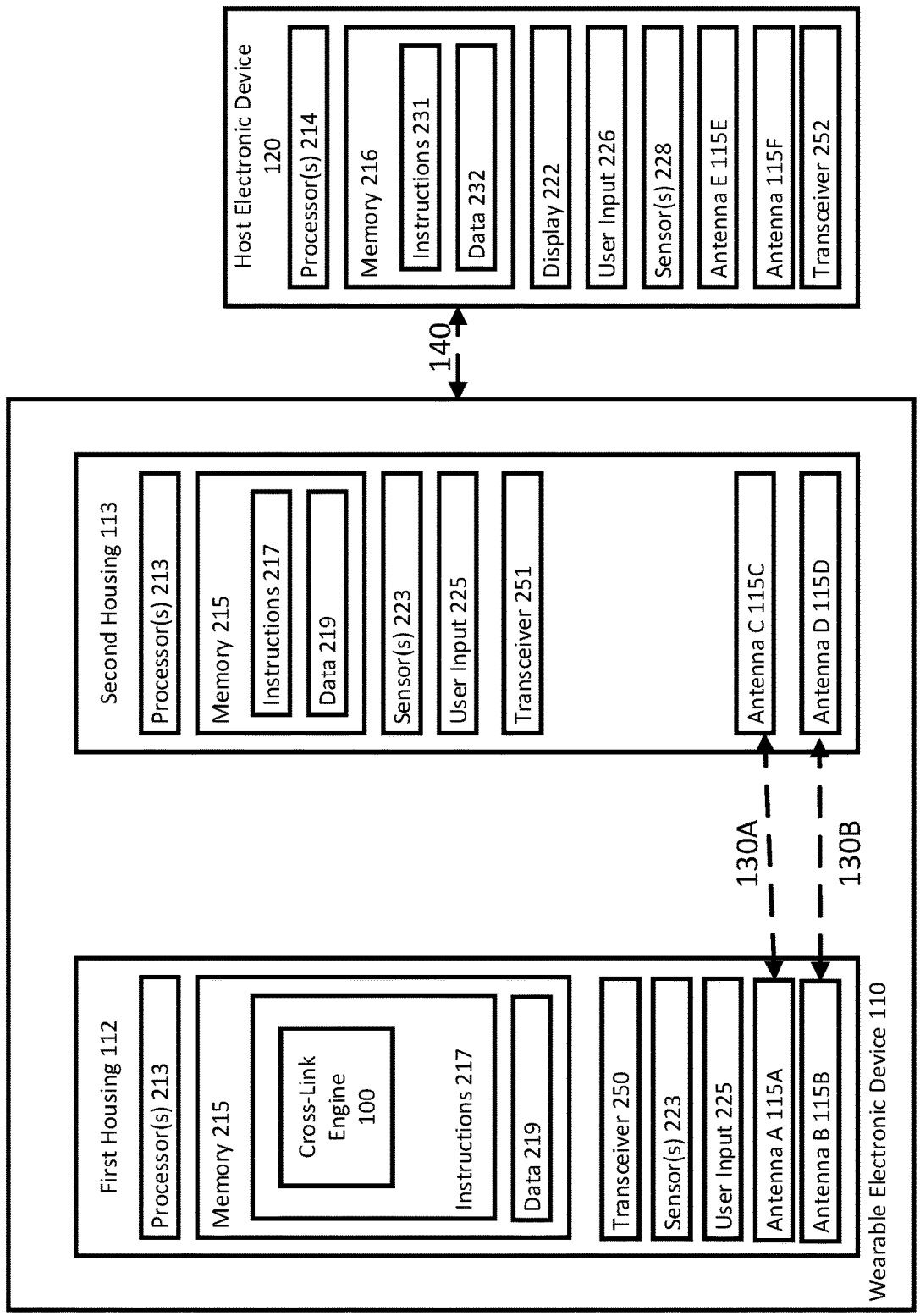
FIG. 2 is a block diagram showing components of the wearable electronic device and the host electronic device.

FIG. 1 is a diagram showing a wearable electronic device 110 in communication with a host electronic device 120. The wearable electronic device 110 can be any of a variety of different types of devices that can be worn by a user 101 and that include a first housing 112 and a second housing 113. The housings 112, 113 can be made from any of a variety of different materials, such as glass, plastic, or metal, and can store at least some of the components of the wearable electronic device 110. For example and as shown in FIG. 2, the first housing 112 can include a cross-link engine 100, an antenna A 115A and an antenna B 115B. The second housing 113 can include an antenna C 115C and an antenna D 115D.

The wearable electronic device 110 can be a pair of wireless earbuds, with components for a first earbud housed in the first housing 112 and components for a second earbud housed in the second housing 113. The wearable electronic device 110 can be a pair of truly wireless earbuds. Truly wireless earbuds refer to earbuds that communicate between each earbud wirelessly, such as, without a cable or other physical connection linking the two earbuds together. Truly wireless earbuds can also communicate wirelessly with other devices, for example, the host electronic device 120.

In some implementations, the wearable electronic device 110 can be other types of wearable electronics. For example, the wearable electronic device 110 can be a pair of glasses, a headset, including virtual reality/augmented reality headsets, a helmet, such as a motorcycle helmet or a skiing/snowboarding helmet, a fitness tracker, a watch, or other such electronic devices that can be worn by a user. In some implementations, the wearable electronic device 110 may not split the antennas 115A-D across multiple housings, but still be configured for the antennas to communicate wirelessly according to aspects of this disclosure. For instance, the wearable electronic device 110 may have a single housing enclosing two or more antennas, such as antennas 115A-115D In some implementations, the housings 112, 113 are structurally connected, but antennas in the housings 112, 113 communicate wirelessly. For example, the housings 112, 113 can be arms of a pair of glasses that each include antennas that communicate wirelessly.

The host computing device 120 can be any electronic device configured to communicate wirelessly with the wearable electronic device 110. For example, the host electronic device 120 can be a smartphone, tablet, computer, or other such device. The host electronic device 120 can include an antenna E 115E and an antenna F 115F.

The antennas 115A-B of the first housing 112 and the antennas 115C-D of the second housing 113 can communicate between each other through an established wireless cross-link. At a same or different time, the antennas 115A-D of the wearable electronic device 110 can communicate with the antennas 115E-F of the host computing device 120 through a different wireless cross-link. As used herein, a wireless cross-link may refer to a wireless communication between two antennas. The two antennas in a cross-link are configured to send and receive data to and from one another. The antennas in a cross-link can periodically send packets of data to one another, for example to monitor the integrity of the cross-link. As described in more detail herein, the integrity of the cross-link refers to a measure of the accuracy and reliability of the cross-link to transmit data between the cross-linked antennas.

In general, the cross-link engine 100 is configured to establish a cross-link, monitor the cross-link, and trigger an adaptive switch to establish an updated cross-link between the antennas 115A-F. In FIGS. 1-2, cross-links are represented by dashed lines between the first and second housings 112, 113 of the wearable electronic device 110, and between the wearable electronic device 110 and the host electronic device 120. For example, the cross-link engine 100 can establish a cross-link 130A between an antenna of the first housing 112 and an antenna of the second housing 113.

In addition or alternatively, the cross-link engine 100 can establish a cross-link 140 between the antennas 115C-D of the second housing 113 and the antennas 115E-F of the host electronic device 120. In other examples, the cross-link 140 can be between the first housing 112 and the host electronic device 120. In other examples, the cross-link engine 100 can establish and maintain only a cross-link between the antennas of first and second housings 112, 113 of the wearable electronic device, for example because the host electronic device 120 is not in operation or in communication with the wearable electronic device.

Referring specifically to the cross-link 130A, the cross-link engine 100 can monitor the integrity of the cross-link 130A, and determine whether it meets a predetermined integrity threshold. The predetermined integrity threshold represents a minimum value the integrity of a cross-link has to meet for the cross-link engine 110 to continue to maintain the cross-link. If the cross-link engine 100 determines, according to aspects of this disclosure, that the integrity of the cross-link 130A does not meet the predetermined integrity threshold, then the cross-link engine 100 can trigger an adaptive switch to establish an updated cross-link, such as cross-link 130B.

Figure 3:
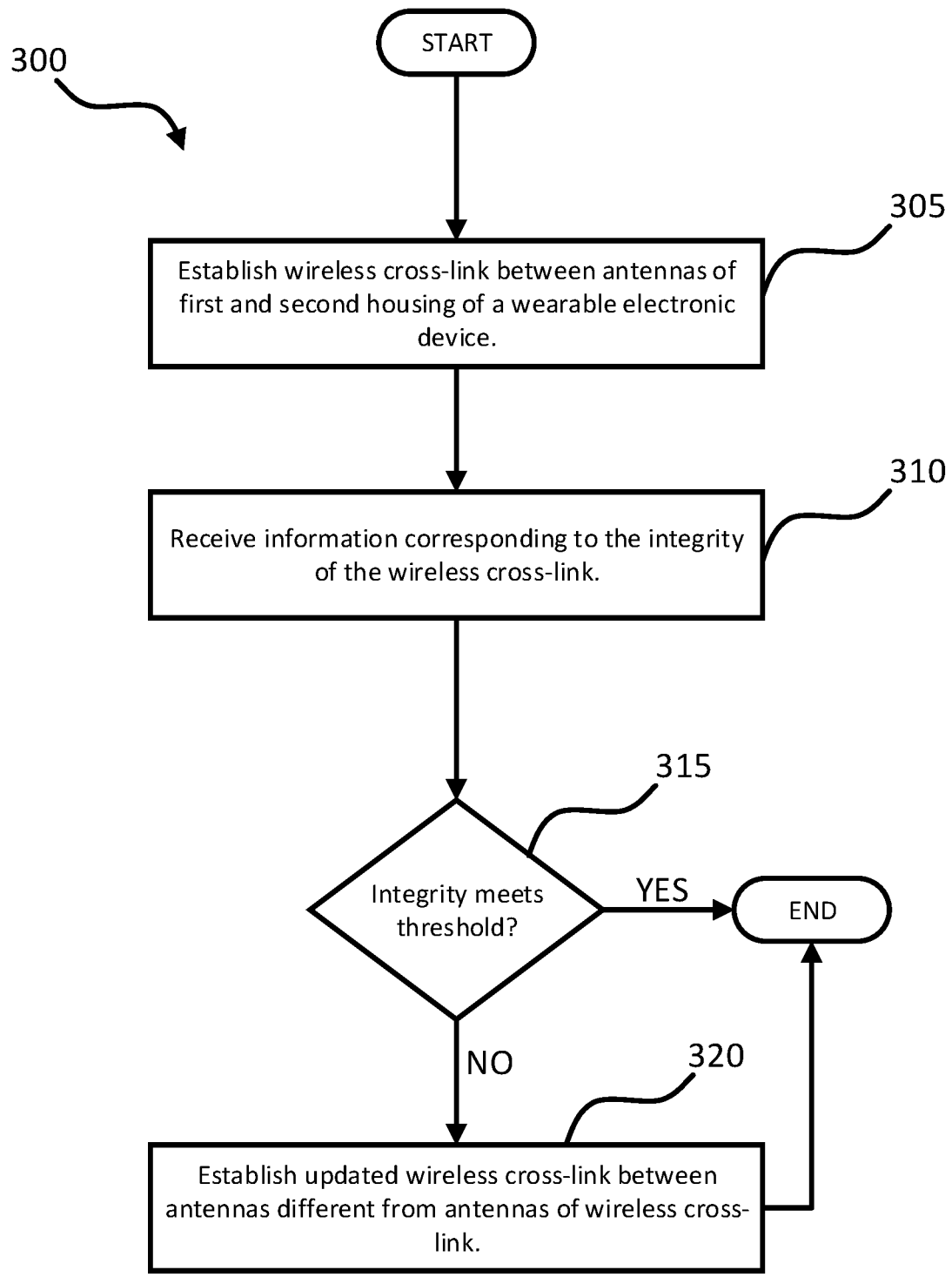
FIG. 3 is a flowchart of an example process for establishing a wireless cross-link between antennas of the wearable electronic device.

As described in more detail herein with respect to FIGS. 2-3, when the cross-link engine 100 triggers an adaptive switch, the cross-link engine 100 can establish an updated cross-link between antennas of the wearable electronic device 110 and/or the wearable electronic device 110 and the host electronic device 120. The antennas in the updated cross-link can be different from the antennas in the previously established cross-link. The antennas are considered different if at least one antenna differs between the previously established cross-link and the updated cross-link.

To establish the updated cross-link, the cross-link engine 100 can search for a new cross-link to update from the previously established cross-link from a set of candidate cross-links that can be established from different combinations of the antennas on the host electronic device 120 and the wearable electronic device 110. The cross-link engine 100 can poll each candidate cross-link to measure its integrity or predicted integrity, or the cross-link engine 100 can switch to cross-links according to different use cases for operation of the wearable electronic device 110 and the host electronic device 120. By monitoring and triggering adaptive switches as appropriate, the cross-link engine 100 can facilitate an accurate wireless connection between the first and second housings 112, and 113 and additionally with the host electronic device 120 even as the environment and the conditions in which the devices 110, 120 are operated change over time.

The cross-links can include cross-head links and cross-body links. In a cross-head link, the cross-link engine 100 establishes a cross-link between the antennas 115A-D of the first and second housing 112, 113 around the head of the user 101 while the wearable electronic device 110 is worn. In a cross-body link, the cross-link engine 100 establishes a cross-link between the antennas 115A-D of the wearable electronic device 110 and the antennas 115E-F of the host electronic device 110 over the body of the user 101 while the wearable electronic device 110 is worn and the host electronic device 120 is possessed by the user 101, for example in a pants-pocket or bag carried by the user 101.

Maintaining the integrity of a cross-body link and/or a cross-head link can pose unique problems over maintaining a cross-link between antennas that are not in devices worn or possessed by a user. One problem is the inherent variability of different sources of interference that can negatively impact the integrity of a cross-head or a cross-body link. For a cross-head link, one source of interference is the user 101, for example the head of the user 101. Different users can have different physical characteristics, such as head/ear shape, the presence or absence of medical implants or medical devices, or accessories worn by the user 101, such as jewelry, glasses, hats, or other clothing. These and other physical characteristics can potentially interfere with a cross-head link.

Similarly, the cross-body link may also be negatively affected by sources of interference unique to the cross-body link communicating between the wearable electronic device 110 and the host electronic device 120. For example, the body of the user 101, including characteristics of the body such as its shape, can affect the cross-body link. As another example, the cross-body link can be affected depending on where the user 101 carries the host electronic device 120, for example in their front pocket, back pocket, in a backpack, or in a bag held at their side. As another example, electromagnetic radiation generated from the body of the user 101 can affect the cross-body link, as different parts of the body such as the torso of the user 101 can emit different intensities of radiation as the head of the user 101. As another example, clothing worn by the user 101 can affect a cross-body link, particularly if the clothing includes any conductive materials like metal.

One or both of the cross-body link and the cross-head link can be negatively impacted in relation to changes in the user 101 and/or changes to the environment in which the wearable electronic device 110 and the host electronic device 120 is operated. For example, if the user 101 puts on or removes clothing or other accessories such as glasses, the integrity of the cross-body link and/or cross-head link may be affected as a result.

Moreover, in the context of wearable electronic devices implemented as truly wireless earbuds, cross-head links may be required to meet a certain level of integrity to ensure certain functions of the truly wireless earbuds are performed that may not be necessary for other types of wearable electronic devices, such as headphones. One such function can be to synchronize incoming data between two wireless earbuds worn by the user 101. In the case of truly wireless earbuds, synchronizing audio cannot be resolved by using a physical connection, such as by a wire, connecting speakers of the earbuds.

For example, the wearable electronic device 110 can be configured to receive audio streamed from the host electronic device 120, such as music. When the music is played on speakers of the wearable electronic device 110, generally the music is played from speakers housed in either earbud. As the audio is streamed from the speakers for the user 101 to listen to, the wearable electronic device 110 may need to buffer audio to ensure that the audio is played at the same time between both earbuds. If the buffer for the audio is implemented on one of the two earbuds, the earbud implementing the buffer can communicate the contents of the buffer over the cross-head link to allow for synchronous audio playback between speakers of both earbuds. If the cross-head link does not meet a certain threshold for integrity, then the earbuds may be unable to synchronously play back audio from the buffer, which can negatively impact the experience of the user 101.

The cross-link engine 100 can maintain separate cross-head and cross-body links to facilitate communication between the wearable electronic device 110 and the host electronic device 120 at the same time. In some implementations, the cross-link engine 100 periodically triggers an adaptive switch even if the integrity of the currently established cross-links meet a predetermined integrity threshold. In doing so, the cross-link engine 100 can actively search for candidate cross-links that may perform better than current cross-links.

FIG. 2 is a block diagram showing components of the wearable electronic device 110 and the host electronic device 120. The wearable electronic device 110 can include one or more processors 213. The processor(s) 213 can be a combination of any kind of processor. For example the processor(s) 213 can include a central processing unit (CPU), a microprocessor, or be part of a system-on-a-chip (SoC). In some implementations, the wearable electronic device 110 includes only one processor housed in either the first or the second housing 112, 113. Also in those implementations, the single processor is configured to process data for components in both housings, as appropriate, and transmit data between the housings 112, 113 through a cross-link established in accordance with aspects of this disclosure.

The first housing 112 and the second housing 113 can also include memory 215 that includes instructions 217 and data 219. The instructions 217 can include one or more instructions written in a computer programming language that when executed by the wearable electronic device 110, causes the wearable electronic device 110 to perform one or more actions. The data 219 can include data that is retrieved, processed, or generated by the wearable electronic device 110 as part of one or more actions performed by the wearable electronic device 110 when the instructions 217 are executed. Separately or as part of the instructions 217, the memory 215 can include instructions and data structures that when executed by the wearable electronic device 110 causes the wearable electronic device 110 to implement the cross-link engine 100 according to some aspects of the disclosure.

The wearable electronic device 110 can include transceivers 250, 251. The transceiver 250 can be implemented in the first housing 112 and the transceiver 251 can be implemented in the second housing 113. The transceivers 250, 251 can be coupled to the respective antennas of the first and second housings 112, 113 and be responsible for sending and receiving data through the antennas.

The wearable electronic device 110 can include user input 225. The user input 225 can be any type of mechanism or technique for receiving input from the user 101 of the wearable electronic device 110. For example, the user input 225 can include a microphone for receiving voice commands from the user 101. As another example, the user input 225 can include a touchpad or other mechanism for receiving touch input from the user 101. The user input 225 can also include buttons, dials, or other physical or digital mechanisms for receiving input from the user 101.

The wearable electronic device 110 can include one or more sensor(s) 223, and the host electronic device 120 can include one or more sensor(s) 228. The sensors can be any of a variety of different types for collecting sensor data from the user 101, the environment in which the wearable electronic device 110 and/or the host electronic device 120 are operated in, or both. As an example, the sensor(s) 223, 228 can include image sensors, such as cameras, including beamforming cameras configured to measure vibrations of a surface within sensor range of the wearable electronic device 110. The sensor(s) can also include audio sensors, such as microphones. As another example, the sensor(s) 223, 228 can also include electrical sensors, such as capacitive sensors; magnetic sensors, such as Hall Effect sensors; and positioning sensors, such as one or more compasses.

As another example, the sensor(s) 223, 228 can include sensors such as inertial measurement units (IMUs) for measuring movement and changes in position and orientation of the wearable electronic device 110 and/or the user 101. IMUs can include one or more gyroscopes for measuring angular motion of the wearable electronic device 110, and can also include one or more accelerometers for measuring linear motion of the computing device 110. Another type of IMU that can be implemented is a voice accelerometer, e.g., a bone conducting microphone, for measuring vibrations caused by the user 100 speaking.

In some implementations IMUs of the sensor(s) 223, 228 can be configured to track angular and/or linear motion of the user 101 or specific body parts of the user 101, such as the head or arms of the user 101. When the wearable electronic device 110 is implemented as a pair of wireless earbuds, IMUs implemented as part of the sensor(s) 223, 228 can be configured to detect position and movement between a first wireless earbud and a second wireless earbud. The sensor(s) 223, 228 can also include sensors that track characteristics of the wearable electronic device 110, such as a remaining battery-life for a battery of the device (not shown).

Different components of the wearable electronic device 110 are shown as being implemented on one or both of the first and second housings 112, 113. In various implementations the ordering and logical positioning of the components can vary between the first housing 112 and the second housing 113. For example, the processor(s) 213 can be implemented in the first housing 112, the second housing 113, or some combination of both the first and the second housing 112, 113. As another example, the cross-link engine 100 can be implemented on either the first housing 112, and the second housing 113, or some combination of the two.

In addition, the different components described in this disclosure can be coupled to the antennas 115A-F in different ways. For example, the antennas 115A-B of the first housing 112 can be coupled through a physical or wireless connection to the sensor(s) 223, 228. Similarly, the antennas 115C-D of the second housing 113 can be coupled through a physical or wireless connection to the sensor(s) 223, 228. Other components can be coupled to the wearable electronic device 110 and/or the host electronic device 120 either through a physical or a wireless connection, such as the sensor(s) 228 with the wearable electronic device 110.

The host electronic device 120 can also include one or more processors 214, memory 216 storing instructions 231 and data 232. The host electronic device 120 can additionally include a display 222 and user input 226, such as a touchscreen or keyboard and mouse. The memory 215, 216 of the devices 110, 120 can also be a combination of any kind, e.g., volatile or non-volatile, including RAM, solid state memory, or hard disk. The host electronic device 120 can also include a transceiver 252 for coordinating data received and sent by the antennas 115E-F.

As described above with reference to FIG. 1, the wearable electronic device 110 and the host electronic device 120 can include antennas 115A-F. Each of the first housing 112, second housing 113, and the host electronic device 120 can include at least two antennas, although in some implementations the housings 112, 113 and the host electronic device 120 can include more, such as three or four antennas each.

The antennas 115A-F can be configured to communicate data according to any of a variety of different short- and long-range connections along a variety of different bandwidths. Example bandwidths include 2.402 GHz to 2.480 GHz, commonly associated with the Bluetooth® standard; 2.4 GHz and 5 GHz, commonly associated with the Wi-Fi® communication protocol; or other communication standards along a variety of other ranges, such as the LTE® standard for wireless broadband communication.

Each pair of antennas 115A-B, 115C-D, 115E-F can be of different types or configurations. In general, the antennas 115A-F can be of any type of antenna, including omnidirectional, horn, patch, dipole, monopole, loop, conical, aperture, and antenna arrays. For example, antenna A 115A and antenna B 115B may be of different types, such as a monopole and an inverted-F antenna (IFA) or a planar inverted-F antenna (PIFA).

The antennas 115A-B (and other pairs 115C-D, 115E-F) can share or differ from each other according to a number of physical characteristics associated with an antenna. Such physical characteristics include the shape, size, and position of the antenna relative to another antenna, or relative to other components in the device implementing the antenna. An antenna may be positioned closer to or further away from certain components such as printed circuit boards located in the wearable electronic device 110, for example because of the conductive properties of the printed circuit board that can affect data transmission by the antenna. Each antenna of a pair of antennas 115A-B, 115C-D, 115E-F can be configured to transmit data along the same or different bandwidths as the other antenna of the pair.

Each pair of antennas 115A-B, 115C-D, 115E-F can be configured to perform any one of a variety of different diversity techniques. A diversity technique involves a primary antenna and a diversity antenna. Different diversity antenna schemes can require diversity according to different characteristics of audio signals received between the antennas. Examples of diversity of these characteristics can include spatial, polarization, or radiation pattern diversities. For example, in one diversity technique, duplicate data is sent to both the primary and the diversity antenna.

In some implementations, each pair of antennas 115A-B, 115C-D, 115E-F can be implemented according to a diversity technique, so that each, antenna in a pair is selected so as to compensate for use cases in which the other antenna in the pair may not perform as reliably. A diversity technique involves a primary antenna and a diversity antenna. For example, antenna A 115A of the antennas 115A-B can be positioned closer to the side of the first housing 112 touching the user 101 when the wearable electronic device 110 is worn, while antenna B 115B can be positioned on the opposite end of the first housing 112, facing away from the user 101 when the device 110 is worn. The relative positioning of the antennas 115A-B can allow, for example, for antenna A 115A (closer to the user 101) to generally transmit data more reliably to the antennas 115C-D of the second housing 113, while antenna B 115B (farther from the user 101) to generally transmit data more reliably to the antennas 115E-F of the hosting electronic device 120.

As another example technique, the antenna A 115A and antenna B 115B can be configured to obtain the same data over different frequencies. The variation in how the data is received by the pair of antennas can reduce the chance of the data being lost or corrupted during communication, and provides variety for adaptively switching cross-links by the wearable electronic device under different use cases or conditions.

In practice, however, the performance of either antenna 115A-B can vary, for example because of the unique geometry and electromagnetic radiation of the user 101. As a result, the antenna B 115B may actually be better suited for transmitting data to the antennas 115C-D of the second housing 113, while the antenna A 115A is better suited for transmitting data to the host electronic device 120. As another example, each antenna can be more suitable for a different type of communication, for example either to communicate across antennas of the housings 112, 113, or to communicate between antennas of the housings 112, 113, and another device.

As another example of diversity, the antenna A 115A can be configured for transmitting data more efficiently in indoor environments, while the antenna B 115B can be configured to transmit data more efficiently in outdoor environments. Depending on the environment the wearable electronic device 110 is operated in, for example either indoors or outdoors, one of the antennas 115A-B will be better suited for transmitting data in a cross-link at different points in time. The cross-link engine 100 factors these types of per-user or per-environment variations in the monitoring and updating of cross-links, to actively maintain the best candidate cross-link between the antennas 115A-F as the current cross-link.

In some implementations, antennas of each pair of antenna can be of the same type of antenna and share some or all physical characteristics between each other. Although the foregoing description referenced pairs of antennas, in some implementations one or both of the wearable electronic device 110 and the host electronic device 120 can include more antennas than just the antennas 115A-F, with the additional antennas grouped in groups of three or four instead of two.

FIG. 3 is a flowchart of an example process 300 for establishing a wireless cross-link between antennas 115A-D of the wearable electronic device 110. The process 300 is described as being performed by a wearable electronic device programmed in accordance with aspects of this disclosure. For example, the wearable electronic device implementing the cross-link engine 100, appropriately programmed, can perform the process 300. Steps of the process 300 can be performed in different orders, with additional steps added or some steps as shown in the process 300 removed.

The wearable electronic device establishes 305 a wireless cross-link between antennas of the wearable electronic device and host electronic device. The wearable electronic device can establish a cross-link when the device is turned on, or in response to user input to begin pairing the antennas of the wearable electronic device, such as antenna A in a first housing and antenna C in a second housing. In some implementations, the wearable electronic device can be stowed in a case that can optionally charge the device when not in operation. In those implementations, the wearable electronic device can be configured to establish a wireless cross-link when removed from the case.

The wireless cross-link can be an initial cross-link of a predetermined pair of antennas. For example and referring to FIG. 1, the wearable electronic device 110 can be configured to initially establish a cross-link between the antenna A 115A and the antenna C 115C. In some implementations, the wearable electronic device polls different combinations of antennas between the first and second housing to determine which pair of antennas to connect in the initial cross-link. The polling and selection are described in more detail herein, with reference to establishing 320 the updated cross-link.

The wearable electronic device receives 310 information corresponding to the integrity of the wireless cross-link. The information can include a measure of the integrity of the established wireless cross-link. The integrity of the wireless cross-link connection can be measured in a variety of different ways. As an example, the integrity of the established cross-link can be measured as the received signal strength indicator (RSSI) of the cross-link. A higher RSSI generally corresponds to a stronger signal received by an antenna, while a lower RSSI generally corresponds to a weaker signal received by the antenna. The wearable electronic device can measure the RSSI from one or both of the antennas in the established cross-link, and the received RSSI measurements can be an indicator of the integrity of the cross-link.

Another example of information that can correspond to the integrity of the wireless cross-link is the size of the contents of an audio buffer for the wearable electronic device. As described above with reference to FIG. 1, when the wearable electronic device is a pair of truly wireless earbuds, the audio buffer stores incoming audio that is transmitted between speakers implemented in separate housings of the wearable electronic device.

A small size of current contents in the buffer relative to the size of the buffer, for example measured in kilobytes, generally indicates that audio is not being received at a rate to sustain synchronized transmission to the other earbud without delay. A large size of current contents in the buffer relative to the size of the buffer generally indicates that audio is being received by the wearable electronic device at a rate to sustain synchronized transmission to the other earbud. If the buffer empties, then the wearable electronic device may not be able to keep playback synchronized, as there will be a delay at least as long as the time it takes to populate the buffer and transmit contents of the buffer to the other earbud for playback. The wearable electronic device can be configured to obtain the buffer contents size and compute a ratio between the contents size and the maximum size of the buffer.

In some implementations, the received information can correspond to a measure of jitter of audio data communicated across the wireless cross-link. Jitter refers to an amount of distortion in a signal, and can be measured in terms of an amount of deviation from an expected waveform of a transmitted signal. In some implementations the wearable electronic device receives a combination of different types of information corresponding to the integrity of the wireless cross-link, such as RSSI and buffer contents size together.

The wearable electronic device can be configured to receive this information periodically or in response to other input to the wearable electronic device, such as sensor input. For example, the wearable electronic device can be configured to receive this information every 10 seconds. In some implementations, the wearable electronic device is configured to receive the information corresponding to the integrity of the wireless cross-link continuously.

In some implementations, the wearable electronic device can additionally or alternatively receive the information in response to sensors of the wearable electronic device and/or the host electronic device recording data meeting a predetermined activity threshold. As described in more detail herein with reference to FIG. 6, the wearable electronic device can be configured to receive information corresponding to the integrity of current wireless cross-links in response to receiving sensor data indicating that the wearable electronic device 110 has been moved outdoors to indoors, or vice versa.

The wearable electronic device determines 315 whether the integrity of the wireless cross-link meets a predetermined integrity threshold. The predetermined integrity threshold can be set to a value to correspond to performance of the wearable electronic device with minimal to no degradation to user experience during operation. The predetermined integrity threshold can also vary depending on the nature of the information received 310 by the wearable electronic device 110 corresponding to the integrity of the wireless cross-link.

As an example, if the wearable electronic device receives an RSSI for the wireless cross-link, then the predetermined integrity threshold can be a minimum RSSI value. The minimum RSSI value can be hand-selected or empirically determined, for example by simulating operation of the wearable electronic device according to cross-links at different RSSI values and determining the minimum value that does not substantially impact user experience during operation. As additional examples, the predetermined integrity threshold can be a minimum ratio of buffer contents to buffer capacity over a period of time, or a tolerated amount of jitter in an audio signal transmitted across the cross-link.

If the wearable electronic device determines that the integrity of the wireless cross-link meets the predetermined integrity threshold, then the process 300 ends. If the wearable electronic device determines that the integrity of the wireless cross-link does not meet the predetermined integrity threshold, then the wearable electronic device establishes 320 an updated cross-link between antennas different from the antennas of the wireless cross-link.

The cross-link engine can poll the integrity of different candidate cross-links that can be formed using the antennas of the first and second housing of the wearable electronic device. For antennas A-B in the first housing and antennas C-D in the second housing, the candidate cross-links are: AC, AD, BC, BD. The candidate cross-links reflect the condition that antennas in the same housing cannot form cross-links amongst themselves. In general, for N antennas in the first housing and M antennas in the second housing, there are N*M candidate cross-links.

As part of polling the integrity of each candidate cross-link, the wearable electronic device can receive a measure of integrity according to some metric, such as RSSI. Then, the wearable electronic device determines which of the candidate cross-links should be selected to update the current cross-link.

Depending on the time, location, and/or condition of the wearable electronic device during operation, the wearable electronic device may poll and identify different preferred candidates for updating the wireless cross-link. For example, consider an established wireless cross-link between antennas A and C (cross-link AC). Cross-link AC may include antennas that are better suited to operate in certain conditions, for example when the user and the wearable electronic device are stationary. If the wearable electronic device begins to move, the cross-link AC may degrade to an integrity below the predetermined threshold. In response, the wearable electronic device may determine that cross-link BD (between antennas B and D) have the highest integrity amongst all the candidate cross-links. Later, the wearable electronic device may be operated in a noisy environment with many sources of interference, for example from other devices wirelessly transmitting data. The cross-link BD may degrade to an integrity below the predetermined threshold, and in the new noisy environment, the cross-link AD may be the best candidate cross-link.

The previous example highlights how the wearable electronic device can benefit from complementary antennas that together are better suited to operate under different conditions. Therefore, the wearable electronic device can transmit data more reliably between housings of the device, at least because the electronic device can actively monitor for drops in performance of a current cross-link as a result of changes to where, when, or how the wearable electronic device is operated.

Using the previous example, if the wearable electronic device determines the cross-link BD to have the highest measure of integrity over all of the candidate cross-links, the wearable electronic device can stop the cross-link AC and establish the updated cross-link BD.

In some cases, the candidate cross-link can be the originally established cross-link. This may occur when the other candidate cross-links have the same or lower measurements of integrity relative to the previously established cross-link. In these cases, the wearable electronic device can end the process 300 without updating the cross-link.

Figure 4A:
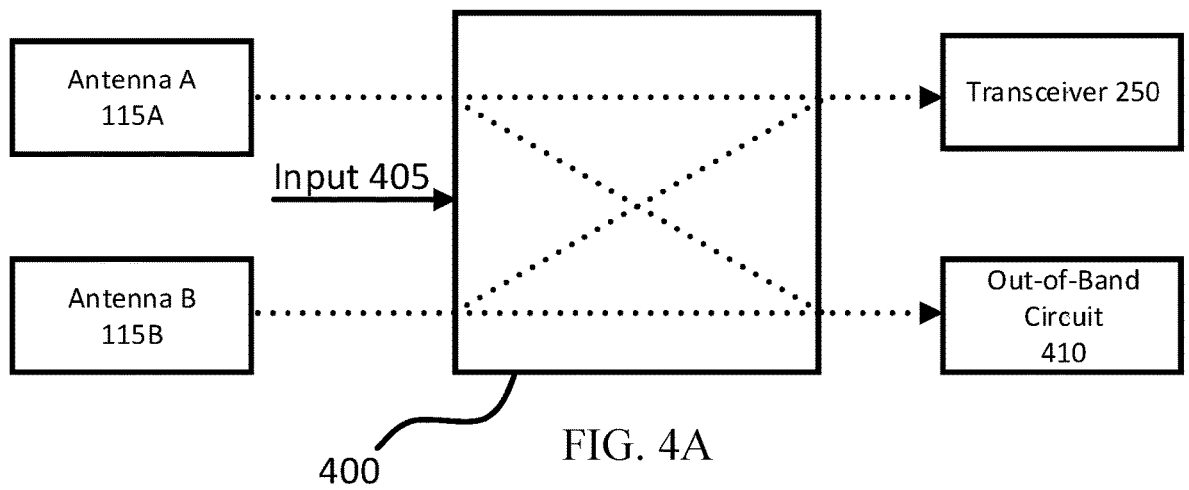
FIGS. 4A-C show a crossover switch adaptively switching between antennas in the wearable electronic device.
Figure 4B:
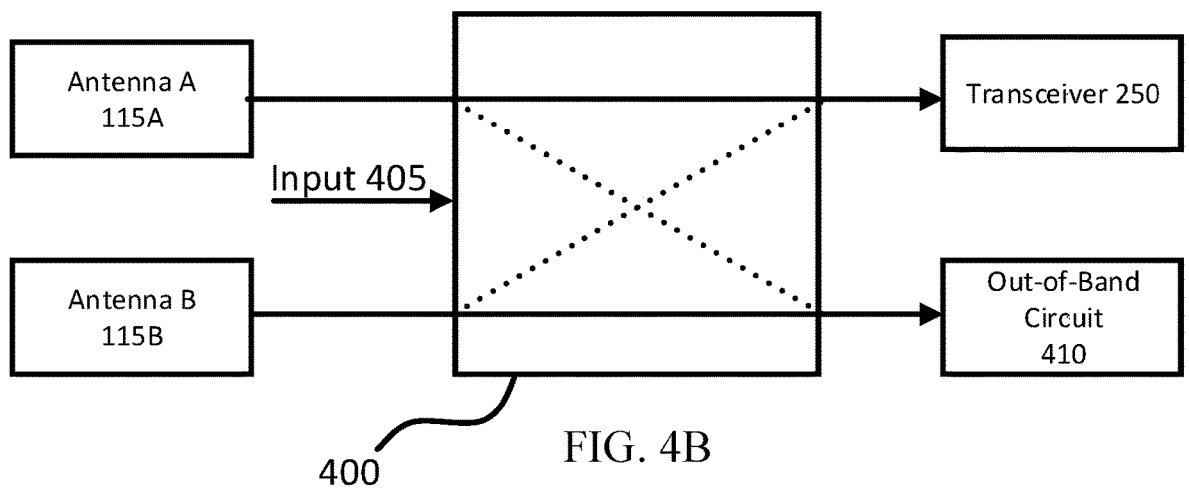
Figure 4C:
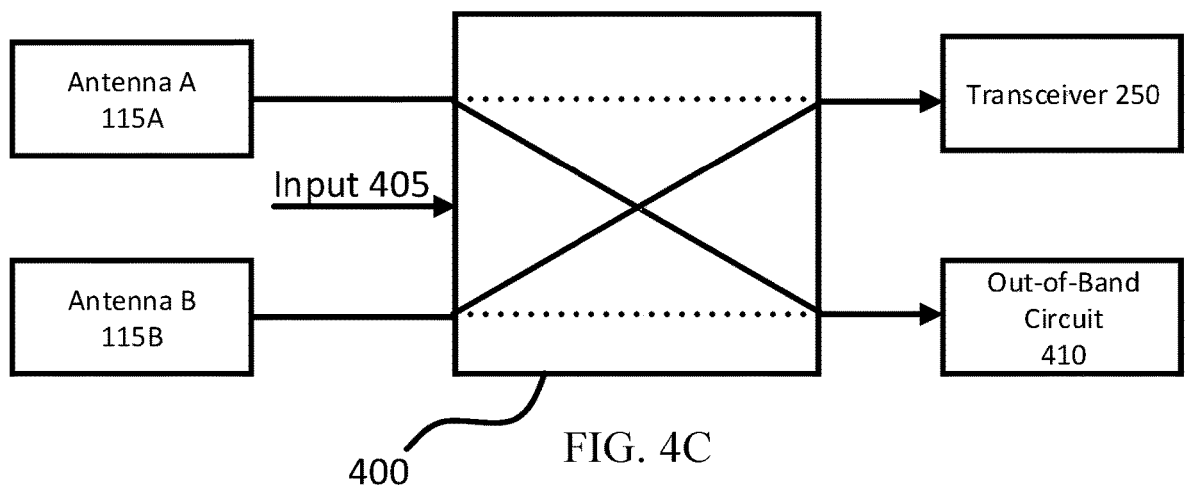

FIGS. 4A-C show a crossover switch 400 adaptively switching between antennas in the wearable electronic device 110. The cross-link engine 100 can be implemented in a variety of ways, such as an integrated circuit or as a computer program executed by one or more processors of the wearable electronic device. In some implementations, the cross-link engine 100 can include the crossover switch 400. In general, the crossover switch 400 is a circuit for switching the antennas 115A-B of the first housing 112 to communicate data to the transceiver 250. Although the description of the crossover switch 400 is made in reference to components of the first housing 112, the crossover switch 400 can be implemented in the second housing 113.

FIG. 4A shows the crossover switch 400 at rest. The crossover switch 400 can pass input from the antennas 115A-B to either the transceiver 250 or an out-of-band (OOB) circuit 410. The OOB circuit 410 is configured to de-tune an antenna of the antennas 115A-B not currently used as part of a cross-link. The unused antenna can be de-tuned to prevent antenna coupling or other potential interference between the antennas 115A-B while the other antenna is in a cross-link. The input 405 represents an input to the crossover switch 400 from the cross-link engine 100. The input 405 can represent which of the antennas 115A-B should be in communication with the transceiver 250. In some implementations, the cross-link engine 100 can determine a candidate cross-link to update over the previously established cross-link, and send an appropriate input to the crossover switch 400 to switch between the antennas 115A-B as appropriate.

FIG. 4B shows the crossover switch 400 passing data from the antenna A 115A to the transceiver 250. Further, FIG. 4B shows antenna B 115B passing to the OOB circuit 410. FIG. 4B can be an example of the crossover switch 400 when a cross-link is initially established between the antenna A 115A and another antenna (not shown). The other antenna can be an antenna from the second housing of the wearable electronic device, or an antenna from the host electronic device.

FIG. 4C shows the crossover switch 400 passing data from the antenna B 115B to the transceiver 250. Further, FIG. 4C shows the antenna A 115A passing to the OOB circuit 410. FIG. 4C can be an example of the crossover switch 400 after the cross-link engine triggers an adaptive switch. In this example, the previously established cross-link included the antenna A 115A, while the newly updated cross-link after the adaptive switch includes the antenna B 115B. The antenna on the other side of the updated cross-link can be the same or different from the previously established cross-link. The input 405 in FIG. 4C can be some input that causes the crossover switch 400 to switch from the antenna A 115A to the antenna B 115B.

Figure 5:
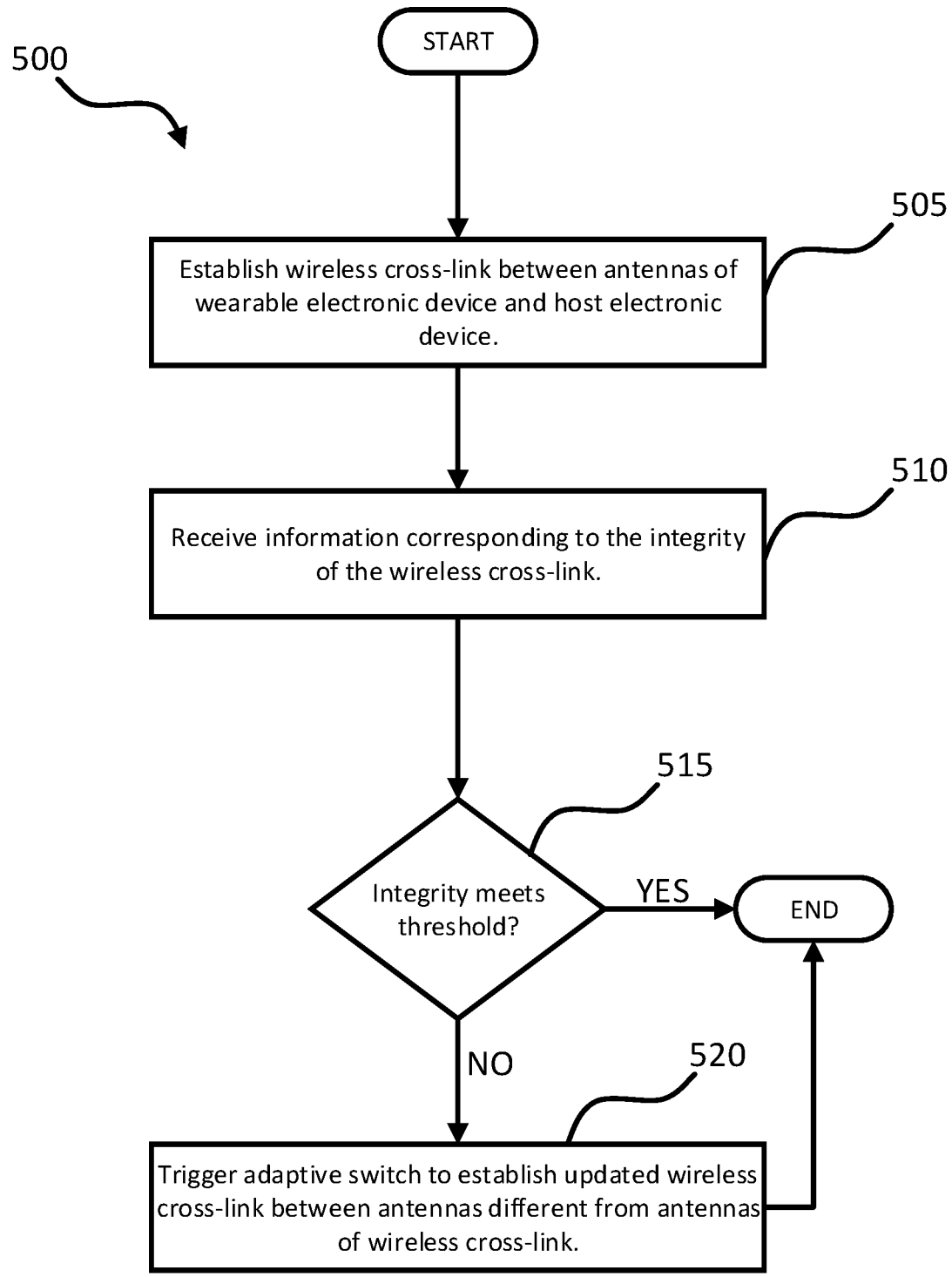
FIG. 5 is a flowchart of an example process for establishing a wireless cross-link between antennas of the wearable electronic device and the host electronic device.

FIG. 5 is a flowchart of an example process 500 for establishing a wireless cross-link between antennas 115A-F of the wearable electronic device 110 and the host electronic device 120. The process 500 is described as being performed by a wearable electronic device programmed in accordance with aspects of this disclosure. For example, the wearable electronic device 110 implementing the cross-link engine 100, appropriately programmed, can perform the process 500. Steps of the process 500 can be performed in different orders, with additional steps added or some steps as shown in the process 500 removed.

The wearable electronic device establishes 505 a wireless cross-link between antennas of the wearable electronic device and host electronic device. The wearable electronic device can establish 505 the wireless cross-link as described above with establishing 305 the wireless cross-link in FIG. 3. The wearable electronic device can establish 505 the wireless cross-link as a cross-body link between the wearable electronic device and the host electronic device possessed by the user of the wearable electronic device. At the same time or at an earlier time, the wearable electronic device can also establish a cross-head link between housings of the wearable electronic device.

In some implementations the links can share an antenna, while in other implementations both antennas in the pair for the updated cross-link are different from antennas in the pair for the previously established cross-link. For example, for the wearable electronic device with antennas A, B, C, and D and the host electronic device with antennas E and F, a cross-head link can be AC and a cross-body link can be ED. The wearable electronic device in some implementations is configured to always establish a cross-body link with the host electronic device and antennas of a particular housing, such as the second housing with antennas C and D.

The wearable electronic device receives 510 information corresponding to the integrity of the wireless cross-link. As described above with reference to FIG. 3 and receiving 310 the information corresponding to the integrity of the wireless cross-link, the wearable electronic device can receive information related to the integrity of the cross-link between the wearable electronic device and the host electronic device. The integrity can be represented as a combination of RSSI, buffer ratio, jitter, or any other measure corresponding to the reliability and accuracy of a cross-link.

The wearable electronic device determines 515 whether the integrity of the wireless cross-link meets a predetermined integrity threshold. The predetermined integrity threshold can be any type of threshold corresponding to a measure of integrity, as described above with reference to FIG. 3 and the determining 315.

If the wearable electronic device determines that the integrity of the wireless cross-link meets the predetermined integrity threshold, then the process 500 ends. If the wearable electronic device determines that the integrity of the wireless cross-link does not meet the predetermined integrity threshold, then the wearable electronic device triggers an adaptive switch to establish 520 an updated cross-link between antennas different from the antennas of the wireless cross-link.

The number of candidate cross-links depends on the number of antennas in the wearable electronic device and the number of antennas in the host electronic device. For example, if the wearable electronic device has N+M antennas (N antennas in a first housing and M antennas in a second housing), and the host electronic device has K antennas, then the total number of candidate cross-body links is (N+M)*K. As a concrete example, if the wearable electronic device has four antennas A, B, C, and D, and the host electronic device has two antennas E and F, then the total number of candidate cross-links is eight, and the candidate cross-links are: AE, BE, CE, DE, AF, BF, CF, and DF.

As described above with reference to FIG. 3 and the determining 315, in some cases there may not be a candidate cross-link with a higher measure of integrity than the previously established cross-link. In some implementations, the wearable electronic device establishes the updated cross-link such that an antenna is not shared with a cross-head link of the wearable electronic device. Separating the cross-links can be useful to prevent delays caused by a bottleneck on an antenna transmitting data to multiple other antennas.

Figure 6:
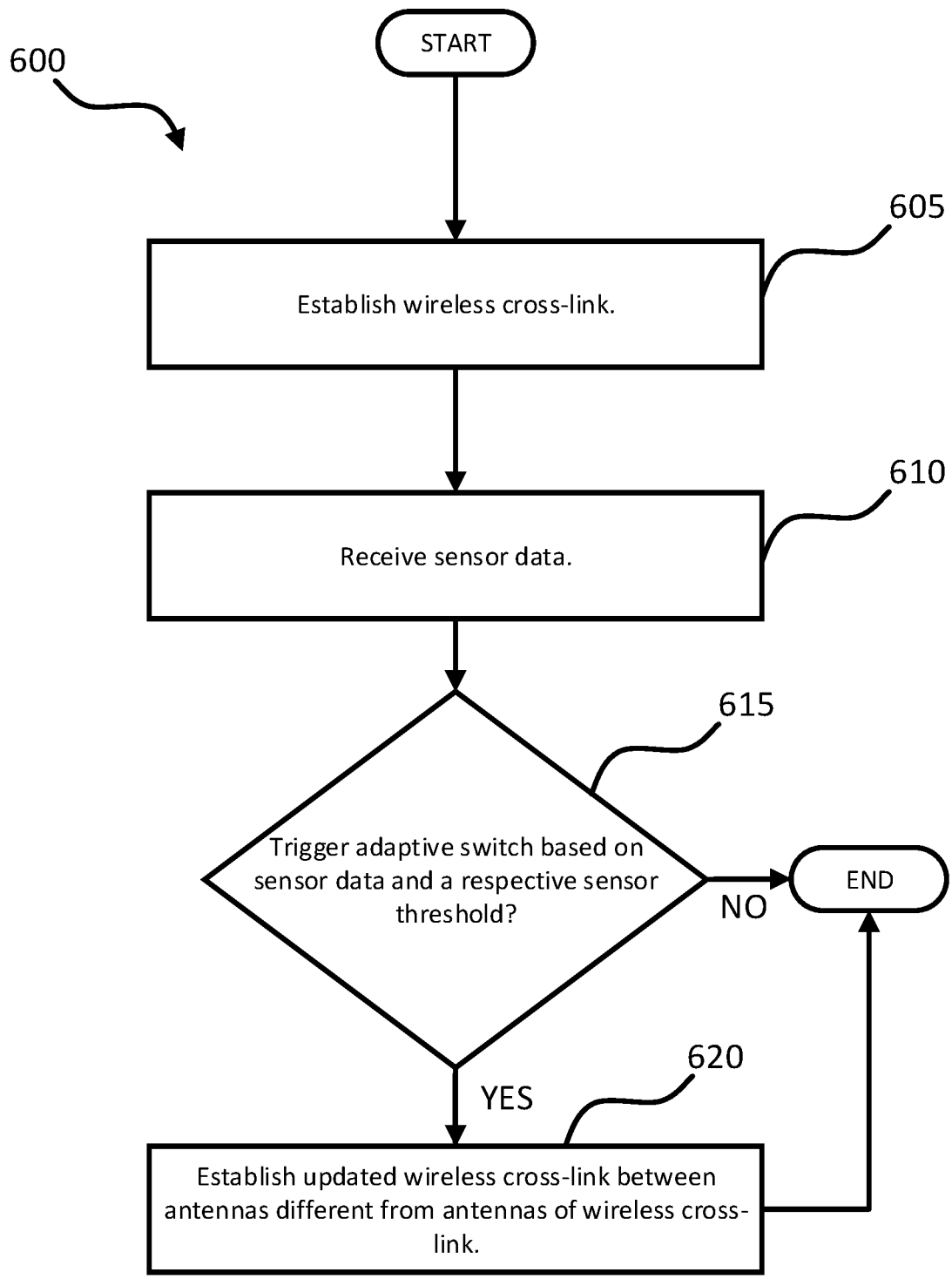
FIG. 6 is a flowchart of an example process for triggering an adaptive switch based on received information.

FIG. 6 is a flowchart of an example process 600 for triggering an adaptive switch based on received information. The process 600 is described as being performed by a wearable electronic device programmed in accordance with aspects of this disclosure. For example, the wearable electronic device 110 implementing the cross-link engine 100, appropriately programmed, can perform the process 600. Steps of the process 600 can be performed in different orders, with additional steps added or some steps as shown in the process 600 removed.

The wearable electronic device establishes 605 a wireless cross-link. As described above with reference to FIGS. 1-4, the wireless cross-link can be between antennas of the wearable electronic device and/or a host electronic device. The wireless cross-link can be, for example, a cross-head link between antennas in separate housings of the wearable electronic device. As another example, the wireless cross-link can be a cross-body link between antennas in the wearable electronic device and antennas in a host electronic device on the body of a user.

The wearable electronic device receives 610 sensor data. The sensor data can come from sensors in the wearable electronic device and/or the host electronic device. The sensor data can include data recorded of the user of the wearable electronic device, the host electronic device, or both. As described above, the sensors can include sensors that collect optical data, image data, data related to the position, orientation or movement of the wearable electronic device and/or user, and data related to electromagnetic fields generated by the user of the wearable electronic device and/or generated in the environment.

The sensor data can also include usage characteristics of the wearable electronic device. Usage characteristics are related to the use or location of the wearable electronic device and/or the host electronic device. Usage characteristics can include the location of the wearable electronic device and/or host electronic device, for example by GPS coordinate.

The wearable electronic device determines 615, from the received sensor data, whether to trigger an adaptive switch based on the sensor data and a respective sensor threshold. The sensor threshold depends on the types of sensor data received 610 by the wearable electronic device.

For example, if the sensor data includes usage characteristics, then the wearable electronic device can determine whether to trigger an adaptive switch based on the usage characteristics. If the usage characteristics include location data, then the wearable electronic device can trigger an adaptive switch in response to the location data meeting a location-trigger threshold. The location-trigger threshold can specify a coordinate range representing a particular location, for example an indoor mall. If the location data indicates that the wearable electronic device and/or host electronic device are within the coordinate range (therefore meeting the location-trigger threshold), then the wearable electronic device can trigger an adaptive switch to potentially switch to a cross-link better suited for indoor operation.

As another example, if the wearable electronic device receives sensor data corresponding to an orientation of one or both housings of the wearable electronic device, then the respective sensor threshold can be an orientation-trigger threshold representing a maximum or minimum value for the orientation to meet before triggering an adaptive switch. For example, the wearable electronic device can trigger an adaptive switch if the orientation of the wearable electronic device changes by a certain number of degrees, such as thirty degrees.

Similar to the orientation of the wearable electronic device and/or the host electronic device, the wearable electronic device can trigger an adaptive switch in response to a change in position of the wearable electronic device meeting a position-trigger threshold. Different from location data, position data recorded by sensors coupled to the wearable electronic device and/or the host electronic device record changes in position, such as if the user begins running or moving in an erratic way. If the movement is quick or sudden enough to meet the position-trigger threshold, the wearable electronic device can trigger an adaptive switch to establish an updated cross-link that is better suited for the user's activity.

The orientation and/or position of the wearable electronic device and/or the host electronic device can be measured directly using one or more sensors for determining orientation/position, such as by an IMU or sensors configured to measure the proximity of the housings of the wearable electronic device from each other and/or from the host electronic device.

As an example, one or more adaptive switches can be triggered when a user removes the host electronic device from their pocket, operates the device, and replaces the device in their pocket. As another example, an adaptive switch may be triggered if the user places the host electronic device back in their pocket, but in a different orientation, for example upside-down, relative to the orientation of the host electronic device when the user removed the device from their pocket.

As another example, the wearable electronic device can receive sensor data corresponding to the electromagnetic radiation emitted by the user of the wearable electronic device. The wearable electronic device can then determine whether to trigger an adaptive switch based on the radiation data meeting a radiation-trigger threshold. The radiation measured by the sensors off of the user or the environment in which the wearable electronic device is operated can vary as a function of different factors, such as reflection patterns of different radiating elements. The radiation-trigger threshold can specify a maximum change in detected radiation intensity before the wearable electronic device triggers an adaptive switch. For example, radiation patterns detected by the sensors may change if the wearable electronic device is operated in a confined environment, such as a subway car, versus in an open field.

If the wearable electronic determines not to trigger the adaptive switch, then the process 600 ends. If the wearable electronic device determines to trigger the adaptive switch, then the wearable electronic device establishes an updated wireless cross-link between antennas different from the antennas connected in the previous wireless cross-link. As described above with reference to FIGS. 3-5, the wearable electronic device can poll candidate cross-links and update the previously established cross-link with the candidate cross-link having the highest measure of integrity.

By triggering the adaptive switch based on sensor data and not according to the predetermined integrity threshold, the wearable electronic device can potentially update the cross-link to improve the integrity over the previously established cross-link, even if the previously established cross-link had a measure of integrity meeting the predetermined threshold. In other words, the wearable electronic device can react to changes in the user and/or environment proximate to the wearable electronic device to update the cross-link without waiting until the cross-link has already degraded below the predetermined integrity threshold.

In some implementations, the wearable electronic device additionally determines whether the measure of integrity of the previously established cross-link falls below the predetermined integrity threshold before triggering the adaptive switch. The wearable electronic device can be configured to check the integrity against the predetermined integrity threshold to help reduce computational costs associated with switching antennas to updated cross-links. The additional check can be a balance between checking to see if the integrity of the previously established cross-link has degraded, and updating the cross-link only when there is a potential for improvement in cross-link integrity.

Aspects of the disclosure can be implemented to realize the following advantages. A consistent and accurate connection between truly wireless earbuds can be actively monitored and maintained to meet a minimum integrity threshold. Connections between the truly wireless earbuds and other wearable electronic devices can be maintained by quickly adapting to different sources of interference from the cross-linked antennas. Sources of interference such as other physical components of the truly wireless earbuds besides the antennas, the head of the user wearing the earbuds, and interference from the environment or changes to the environment in which the wearable electronic device is operated can be mitigated to reduce communication degradation.

A device configured consistent with aspects of this disclosure can actively monitor a current cross-link and change the cross-link in response to signal degradation, which can be measured in a variety of ways. Further, the wearable electronic device can receive additional information, for example, regarding the physical location in which the wearable electronic device is operated, and adaptively adjust communication between antennas that are better suited for specific use cases.

Different use cases can be specific to different users. For example, for some users, cross-head communication of antennas in different housings of a pair of truly wireless earbuds may generally result in more or less interference as compared with another user using the same device. This may be because of personal differences in the physiology and geometry of different users' bodies. Similarly, the quality of cross-body communication between a pair of earbuds and a host device, such as a smartphone in a user's pocket, can also vary depending on the user, physical characteristics of their body, and/or their clothing and where they store the host electronic device. Aspects of this disclosure provide for the same device to adaptively switch to communication links better suited for cross-device communication, which can vary from user-to-user.

The device can adaptively change the endpoints of communication between antennas of the wearable electronic device in a user- and environment-agnostic way. In other words, the device can monitor and trigger updates to the antennas used by the wearable electronic device to form a cross-link without assumptions about sources of interference such as the user or the environment.

Alternatively or in addition, the wearable electronic device configured according to aspects of this disclosure can maintain a cross-link between the wearable electronic device and a host electronic device, such as a cellphone. The wearable electronic device can monitor and trigger updates as needed for multiple cross-links, for example between antennas of the wearable electronic device and between the wearable electronic device and the host electronic device, in response to different sources of interference.

Aspects of this disclosure can be implemented in digital circuits, computer-readable storage media, as one or more computer programs, or a combination of one or more of the foregoing. The computer-readable storage media can be non-transitory, such as one or more instructions executable by a cloud computing platform and stored on a tangible storage device.

A computer program can be written in any type of programming language, and according to any programming paradigm, such as declarative, procedural, assembly, object-oriented, data-oriented, functional, or imperative. A computer program can be written to perform one or more different functions and to operate within a computing environment, such as on a physical device, virtual machine, or across multiple devices. A computer program can also implement the functionality described within the disclosure as performed by a system, engine, module, or model.

As used herein, the phrase "configured to" is used in different contexts related to computer systems, hardware, or part of a computer program, module, or engine. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations.

When a computer program, module, or engine, is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments.

The invention claimed is:

1. A wearable electronic device, comprising:
    a first housing including a first and second antenna;
    a second housing including a third and fourth antenna; and
    one or more processors, the one or more processors configured to:
        establish a wireless cross-link between (i) either the first or second antenna of the first housing and (ii) either of the third antenna or fourth antenna of the second housing;
        receive information corresponding to the integrity of the wireless cross-link between the respective antennas of the first and second housing;
        determine that the integrity of the wireless cross-link does not meet a predetermined integrity threshold;
        establish, in response to the determination that the integrity of the wireless cross-link does not meet the predetermined integrity threshold, an updated wireless cross-link between respective antennas of the first and second housing that are different from the antennas connected by the wireless cross-link; and
        establish the updated wireless cross-link using a crossover switch coupling the first and the second antenna to a transceiver in the first housing.

2. The wearable electronic device of claim 1, wherein the one or more processors are further configured to:
    trigger an adaptive switch on the wearable electronic device to establish the updated wireless cross-link, wherein the adaptive switch comprises:
        polling each of a plurality of candidate cross-links between the first, second, third, and fourth antenna of the wearable electronic device to determine a respective measure of integrity, and
        selecting the candidate cross-link with the highest measure of integrity as the updated wireless cross-link.

3. The wearable electronic device of claim 1,
    wherein the wireless cross-link is a first wireless cross-link, and
    wherein the one or more processors are further configured to:
        establish a second wireless cross-link between (i) either the first, second, third, and fourth antenna of the wearable electronic device and (ii) a fifth antenna of a host electronic device coupled to the wearable electronic device;
        receive information corresponding to the integrity of the second wireless cross-link between the respective antennas of the wearable electronic device and the host electronic device;
        determine that the integrity of the second wireless cross-link does not meet the predetermined integrity threshold; and
        establish, in response to the determination that the integrity of the second wireless cross-link does not meet the predetermined integrity threshold, a second updated wireless cross-link between respective antennas of the wearable electronic device and the host electronic device that are different from the antennas connected by the second wireless cross-link.

4. The wearable electronic device of claim 3, wherein the second wireless cross-link is a cross-body link formed across the body of a user of the wearable electronic device and the host electronic device, when both the wearable electronic device and the host electronic device are worn on the body of the user.

5. The wearable electronic device of claim 3, wherein the one or more processors are further configured to:
    establish the second updated wireless cross-link between respective antennas of the wearable electronic device and the host electronic device that are different from the antennas connected by the first updated wireless cross-link.

6. The wearable electronic device of claim 3, wherein the one or more processors are further configured to:
    receive usage characteristics related to the use or location of the wearable electronic device or the host electronic device through one or more sensors coupled to the wearable electronic device; and
    trigger an adaptive switch of the updated first or second wireless cross-link to establish a new wireless cross-link in response to the received usage characteristics.

7. The wearable electronic device of claim 6, wherein the wearable electronic device further comprises the one or more sensors.

8. The wearable electronic device of claim 6,
    wherein the usage characteristics comprise location data of the physical location of the host electronic device, and
    wherein the one or more processors are further configured to trigger the adaptive switch of the updated first or second wireless cross-link in response to receiving location data indicating a change of location of the wearable electronic device or the host electronic device meeting a location-trigger threshold.

9. The wearable electronic device of claim 6,
    wherein the usage characteristics comprise orientation data of the physical orientation of at least part of the body of a user of the wearable electronic device, and
    wherein the one or more processors are further configured to trigger the adaptive switch of the updated first or second wireless cross-link in response to received orientation data indicating a change of orientation of the body of the user meeting an orientation-trigger threshold.

10. The wearable electronic device of claim 1, wherein the wearable electronic device is a pair of truly wireless earbuds comprising a first earbud comprising the first housing and a second earbud comprising the second housing.

11. The wearable electronic device of claim 10,
    wherein the first earbud and the second earbud comprise respective sensors, wherein the updated wireless cross-link is a cross-head link between antennas of the first and the second earbud formed across the head of a user of the wearable electronic device, when the wearable electronic device is worn in the ears of the user, and wherein the one or more processors are further configured to:
receive sensor data from at least one sensor of the respective sensors of the first earbud and the second earbud,
trigger an adaptive switch of the updated wireless cross-link to establish a new wireless cross-link in response to the received sensor data.

12. The wearable electronic device of claim 11,
wherein the respective sensors comprise sensors configured to measure changes in the orientation or position of one or both of the first earbud and the second earbud, and
wherein the one or more processors are further configured to:
trigger the adaptive switch of the updated wireless cross-link to establish the new wireless cross-link in response to received sensor data indicating a change in the orientation or the position of one or both of the first earbud and the second earbud meeting a predetermined orientation- or position-trigger threshold.

13. The wearable electronic device of claim 11,
wherein the respective sensors comprise sensors configured to measure changes in radiation emitted from or reflected by a user of the wearable electronic device; and
wherein the one or more processors are further configured to:
trigger the adaptive switch of the updated wireless cross-link to establish the new wireless cross-link in response to received sensor data indicating a change in the radiation emitted from or reflected by the user and meeting a predetermined radiation-trigger threshold.

14. The wearable electronic device of claim 1,
wherein the first antenna is a planar antenna, and
wherein the second antenna is a monopole antenna.

15. The wearable electronic device of claim 1,
wherein the one or more processors are further configured to receive a received signal strength indicator (RSSI), and
wherein the predetermined integrity threshold is a minimum RSSI for the wireless cross-link.

16. The wearable electronic device of claim 1,
wherein the wearable electronic device further comprises input hardware and a buffer configured to store incoming audio received by the input hardware,
wherein the one or more processors are further configured to receive a ratio of data stored in the buffer to the maximum capacity of the buffer over a period of time, and wherein the predetermined integrity threshold hold is a minimum ratio of data stored in the buffer to the maximum capacity of the buffer over a period of time.

17. A method comprising:
establishing a wireless cross-link between (i) either of a first or second antenna of a first housing of a wearable electronic device and (ii) either of a third antenna or fourth antenna of a second housing of the wearable electronic device;
receiving information corresponding to the integrity of the wireless cross-link between the respective antennas of the first and second housing;
determining that the integrity of the wireless cross-link does not meet a predetermined integrity threshold;
establishing, in response to the determining, an updated wireless cross-link between respective antennas of the first and second housing that are different from the antennas connected by the wireless cross-link; and
establishing the updated wireless cross-link using a crossover switch coupling the first and the second antenna to a transceiver in the first housing.

18. The method of claim 17,
wherein the wireless cross-link is a first wireless cross-link, and
wherein the method further comprises:
establishing a second wireless cross-link between (i) either the first, second, third, and fourth antenna of the wearable electronic device and (ii) a fifth antenna of a host electronic device coupled to the wearable electronic device;
receiving information corresponding to the integrity of the second wireless cross-link between the respective antennas of the wearable electronic device and the host electronic device;
determining that the integrity of the second wireless cross-link does not meet the predetermined integrity threshold; and
establishing, in response to determining that the integrity of the second wireless cross-link does not meet the predetermined integrity threshold, a second updated wireless cross-link between respective antennas of the wearable electronic device and the host electronic device that are different from the antennas connected by the second wireless cross-link.

19. The method of claim 18, further comprising:
establishing the second updated wireless cross-link between respective antennas of the wearable electronic device and the host electronic device that are different from the antennas connected by the first wireless cross-link.

* * * * *